(12) United States Patent
Bahlmann et al.

(10) Patent No.: US 6,362,583 B1
(45) Date of Patent: Mar. 26, 2002

(54) CONTROL UNIT FOR A BRUSHLESS MOTOR AND READ/WRITE DEVICE INCLUDING SUCH A CONTROL UNIT

(75) Inventors: Johannes Petrus Maria Bahlmann, Veldhoven; Henricus Marinus Van Hout, Eindhoven, both of (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/618,189

(22) Filed: Jul. 18, 2000

(30) Foreign Application Priority Data

Jul. 20, 1999 (EP) ............................................. 99202382

(51) Int. Cl.[7] .................................................. H02P 6/18
(52) U.S. Cl. ........................ 318/254; 318/439; 318/490; 318/474
(58) Field of Search ................................ 318/138, 254, 318/439, 474, 490, 652, 700, 720, 721, 722, 724

(56) References Cited

U.S. PATENT DOCUMENTS

| | | | | |
|---|---|---|---|---|
| 4,066,935 A | * | 1/1978 | Takaoka et al. | 318/138 |
| 4,644,234 A | * | 2/1987 | Nola | 318/254 |
| 4,841,213 A | * | 6/1989 | Tomasek | 318/661 |
| 5,254,914 A | * | 10/1993 | Dunfield et al. | 318/254 |
| 5,783,920 A |   | 7/1998 | Hahn | 318/500 |
| 5,838,128 A | * | 11/1998 | Maiocchi et al. | 318/439 |

OTHER PUBLICATIONS

"Control Equipment of PM Motor", Patent Abstracts of Japan, Publication No. 09271198, dated OCt. 14, 1997.

* cited by examiner

Primary Examiner—Bentsu Ro

(57) ABSTRACT

A control unit (1) according to the invention for controlling a brushless motor (5) includes position detection means (10) for generating a signal (S1) which is indicative of the position of the motor (5). The control unit (1) further includes supply means (20a, 20b, 20c) for energizing two or more coils (5a, 5b, 5c) of the motor (5) and output terminals (30a, 30b, 30c) for electrically coupling the coils (5a, 5b, 5c) to the supply means (20a, 20b, 20c). The position detection means (10) include polarity detection means (T3, D3, T4, D4, A1) for generating a polarity signal (S1) which is a measure of the direction of the current (Ia) through at least one of the coils (5a). The control unit (1) in accordance with the invention is particularly suitable for use in a device for reading and/or writing an information carrier (6).

6 Claims, 8 Drawing Sheets

 S5 FIG. 5A
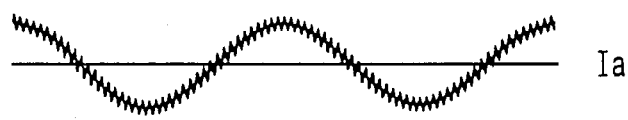 Ia FIG. 5B
 S1 FIG. 5C
 S4 FIG. 5D
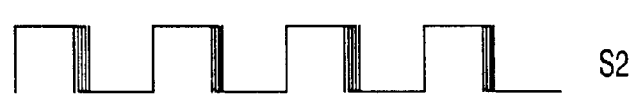 S2 FIG. 5E
 S3 FIG. 5F
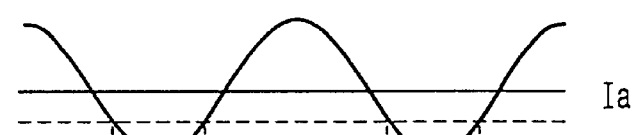 Ia FIG. 6A
 S1 FIG. 6B
 S4 FIG. 6C
 S2 FIG. 6D
 S3 FIG. 6E

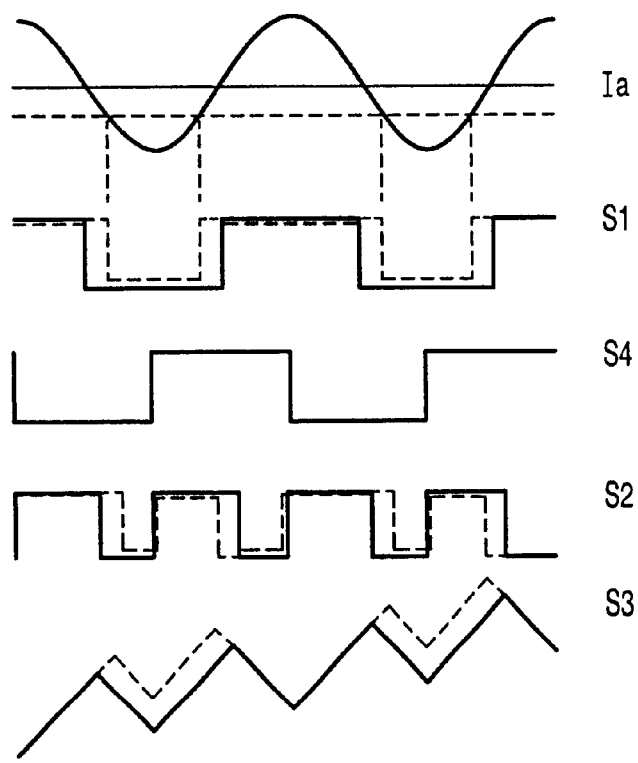
FIG. 7A
FIG. 7B
FIG. 7C
FIG. 7D
FIG. 7E
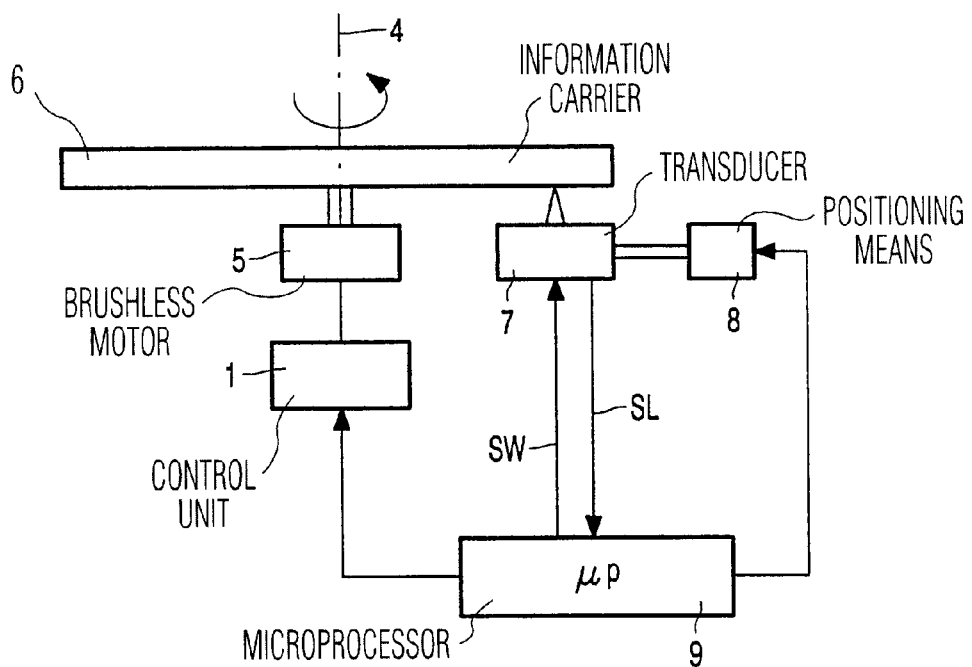
FIG. 8

CONTROL UNIT FOR A BRUSHLESS MOTOR AND READ/WRITE DEVICE INCLUDING SUCH A CONTROL UNIT

FIELD OF THE INVENTION

The invention relates to a control unit for a brushless motor, comprising
- position detection means for generating a signal indicative of the position of the motor,
- supply means for energizing two or more coils of the motor in response to said signal,
- output terminals for electrically coupling the coils to the supply means.

The invention further relates to a device for reading and/or writing an information carrier, which device includes such a control unit.

DESCRIPTION OF PRIOR ART

Such a control unit is known from U.S. Pat. No. 5,783,920. The control unit controls a motor having three windings, one of the three windings being alternately non-energized. The back EMF of the non-energized winding is measured. This signal is used for synchronizing a voltage-controlled oscillator (VCO). The VCO controls a state machine, which controls the winding energization. The known control unit has the advantage that it does not require a separate sensor for measuring the position of the motor. However, a disadvantage of this control unit is that the alternate energization and non-energization of the windings produces annoying noises. It is therefore desirable to drive the windings with a pulse-width modulated signal whose pulse width varies in a sinusoidal fashion, the signal being modulated with a non-audible frequency, for example higher than 20 kHz, for example 30 kHz. However, the time for measuring the back EMF is then inadequate.

SUMMARY OF THE INVENTION

It is an object of the invention to provide a control unit which enables the motor windings to be driven with a pulse-width modulated signal without a separate sensor being necessary.

For this purpose the control unit according to the invention is characterized in that the position detection means include polarity detection means for generating a signal which is a measure of the direction of the current through at least one of the coils. When the speed of the motor is sufficiently high there is a reliable relationship between the polarity of the current through the winding and the position of the motor. The polarity of the current can be measured easily regardless of whether the winding is energized or is not energized.

An attractive embodiment is characterized in that the supply means comprise a first series arrangement of controllable semiconductor elements, an output terminal being coupled to a first node of the semiconductor elements, and the polarity detection means comprise a second series arrangement of controllable semiconductor elements, which second series arrangement has a second node, and the semiconductor elements in the second series arrangement being driven in synchronism with the semiconductor elements in the first series arrangement, which polarity detection means further include voltage comparison means having a first input coupled to the first node and having a second input coupled to the second node. In this embodiment the polarity detection means and the supply means can easily be integrated together in one IC.

Preferably, the control unit in accordance with the invention is characterized by modulating means for generating a pulse-width modulated control signal for controlling the supply means. By energizing the motor with a pulse-width modulated supply voltage, using a modulation frequency which is substantially higher than the commutation frequency of the motor, a silent drive is obtained. However, the invention likewise applies to control means which do not include such modulation means.

In an attractive embodiment of the control unit in accordance with the invention the supply means comprise a phase-locked loop.

A favorable variant of this embodiment of the control unit in accordance with the invention is characterized in that the phase-locked loop includes logic combination means, such as an EXOR, a NAND or a NOR gate, for determining a phase difference between the polarity signal and a feedback signal of the phase-locked loop. In this variant the setting of the phase-locked loop is comparatively immune to an offset in the polarity detector and to interference as a result of the high-frequency modulation of the supply voltage of the motor. Alternatively, the phase detector may be of the sequential type, such as a D flip-flop, an SR flip-flop.

The control unit is particularly suitable for use in device in accordance with the invention for reading and/or writing a rotating information carrier. A device in accordance with the invention includes a transducer for converting a pattern recorded on the information carrier into a read signal, or for recording a pattern on the information carrier in response to a write signal, which device includes a brushless motor for rotating the information carrier and a control unit in accordance with the invention, for controlling the motor.

BRIEF DESCRIPTION OF THE DRAWING

These as well as other aspects of the invention will be described in more detail with reference to the drawings. In the drawings:

FIGS. 5A to 5F show signals in the control unit in a first situation, FIGS. 6A to 6E show signals in the control unit in a second situation, FIGS. 7A to 7E show signals in the control unit in a third situation, FIG. 8 shows a device for reading and/or writing an information carrier, including a control unit in accordance with the invention.

DETAILED DESCRIPTION OF THE PREFERRED EMBODIMENTS

Figure 1:
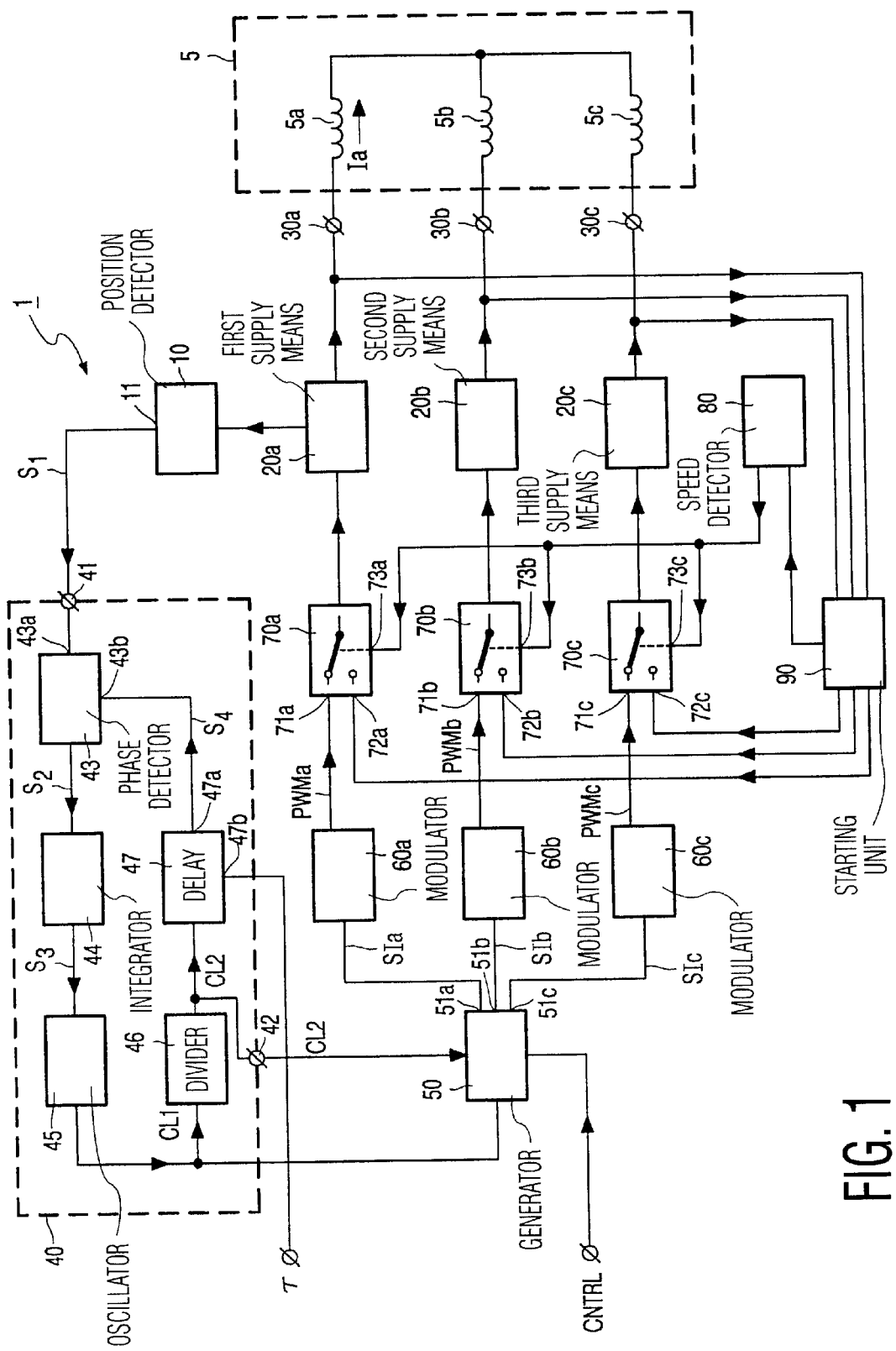
FIG. 1 shows diagrammatically a control unit in accordance with the invention.
Figure 2:
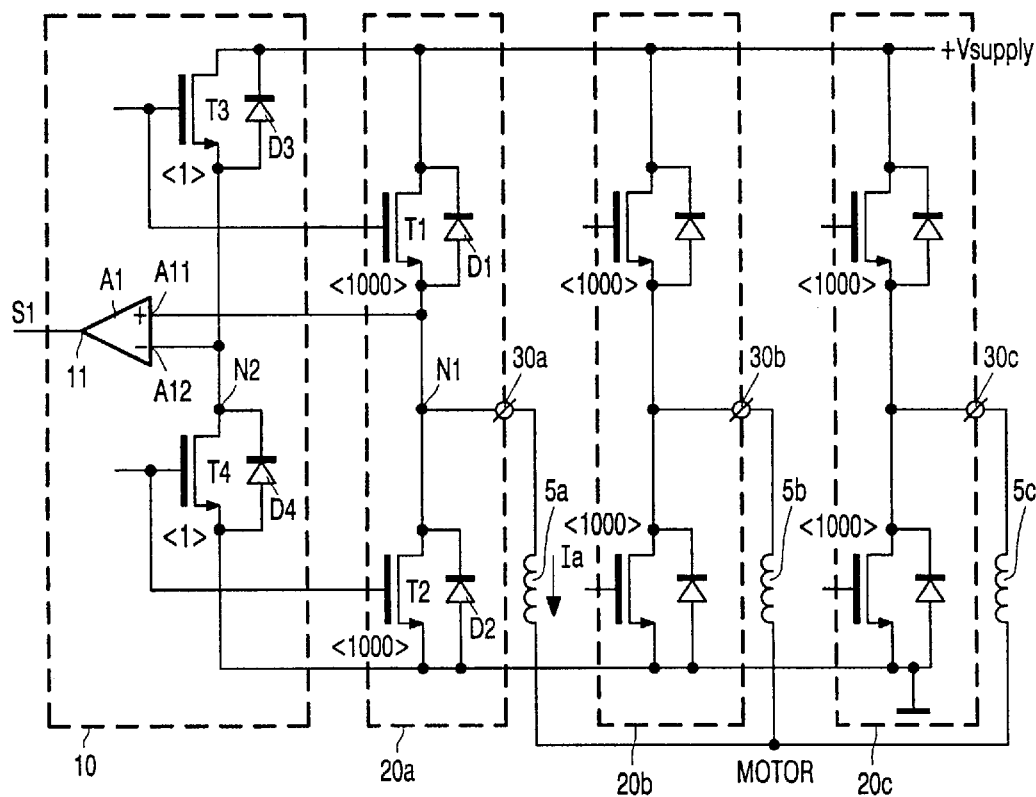
FIG. 2 shows in greater detail a first part of the control unit shown in FIG. 1.

FIG. 1 shows diagrammatically an embodiment of a control unit 1 in accordance with the invention for controlling a brushless motor 5. The present control unit 1 includes position detection means 10 for generating a signal S1 which is indicative of the position of the motor 5. The control unit 1 further has supply means 20a, 20b, 20d for energizing two or more coils 5a, 5b, 5c of the motor 5 in response to said signal S and has output terminals 30a, 30b, 30c for electrically coupling the coils 5a–c to the supply means 20a–c. In the present case the supply means 20a–c comprise a first supply unit 20a, a second supply unit 20b and a third supply unit 20c. The control unit 1 in accordance with the invention is characterized in that the position detection means 10 include polarity detection means for generating a polarity signal S1 which is a measure of the direction of a current Ia through at least one of the coils 5a. FIG. 2 shows in greater detail an attractive version of the polarity detection means 10. The control unit 1 further includes a phase-locked loop (PLL) 40 having an input 41 coupled to the polarity detection means 10. The PLL has an output 42 connected to a generator 50 (shown in more detail in FIG. 3) having a first, a second and a third output 51a–c for supplying three mutually phase-shifted sinewave signals SIa, SIb, SIc. The PLL 40 includes a phase detector 43 for generating an error signal S2 which is indicative of the difference in phase between the polarity signal S1 and a feedback signal S4, an integrator 44 for filtering the error signal S2, and a controllable oscillator 45 for generating a first clock signal CL1 having a frequency f determined by the filtered error signal S3. The phase detector 43 takes the form of an EXOR gate, which constitutes logic combination means. The EXOR gate 43 has a first input 43a for receiving the polarity signal S1 and a second input 43b for receiving the feedback signal S4. The output signal S2 of the EXOR gate 43 is indicative of the phase difference between the two signals S1, S4. The PLL 40 further includes a divider 46 which generates a second clock signal CL2 of a frequency f/N from the first clock signal CL1, and a controllable delay element 47. This delay element 47 can provide compensation for the delays in the motor 5 which depend on its impedance. The controllable delay element 47 has an output 47a for supplying the feedback signal S4. Preferably, the delay element 47 has a delay of a predetermined duration, as opposed to a delay which corresponds to a constant angle. The delay unit 47 preferably also has an input 47b for receiving a signal τ for adjusting the duration so as to enable this duration to be adapted to the characteristics of the motor 5.

The generator 50 has each of its outputs 51a–c coupled to a pulse-width modulator 60a, 60b, 60c to generate a pulse-width modulated signal PWMa, PWMb, PWMc having a duty cycle proportional to the value of the respective sinewave signal SIa, SIb, SIc. The supply units 20a–c are coupled to the pulse-width modulators 60a–c via switching means 70a–c. For this purpose, the switching means 70a–c each have a first input 71a–c coupled to a respective pulse-width modulator 60a–c. The switching means 70a–c each further have a second input 72a–c coupled to a conventional starting unit 90. The control unit 1 further includes a speed detector 80. The speed detector 80 is connected to a control input 73a–c of each respective switching means 70a–c.

An attractive version of the polarity detection means 10 will now be described with reference to FIG. 2. In addition to the polarity detection means 10 FIG. 2 also shows the supply means 20a–c. The supply means 20a–c include a supply unit 20a having a first series arrangement of controllable semiconductor elements T1, T2, an output terminal 30a being coupled to a first node N1 of the semiconductor elements T1, T2. The output terminal 30a is connected to a coil 5a of the motor 5. The semiconductor elements T1, T2 are shunted with freewheel diodes D1, D2. These diodes may be provided as separate elements or they may be integral with the controllable semiconductor elements T1, T2. The supply means 20a–c include two further supply units 20b, 20c for energizing the further coils 5b, 5c of the motor 5. The polarity detection means 10 include a second series arrangement of controllable semiconductor elements T3, T4. The second series arrangement has a second node N2. The semiconductor elements T3, T4 in the second series arrangement are controlled in synchronism with the semiconductor elements T1, T2 in the first series arrangement. The polarity detection means 10 further include voltage comparison means formed by a comparator A1. The comparator has a first input A11 coupled to the first node N1 and has a second input A12 coupled to the second node N2. The semiconductor elements T3, T4 in the second series arrangement can be dimensioned considerably smaller than those of the first series arrangement because they are hardly loaded electrically. In the present example the semiconductor elements T3, T4 have an area which is in a ratio of 1:1000 to that of the semiconductor element T1, T2.

Preferably, the control unit in accordance with the invention uses N-type semiconductor elements because these have a comparatively low voltage drop per unit of area. Suitable types are for example N-type C-MOS, extended N-type C-MOS, N-type lateral D-MOS and N-type vertical D-MOS. Bipolar elements are also suitable but they are less accurate because the current via the control electrodes of the semiconductor elements T3, T4 influences the polarity detection.

In the present example each of the coils 5a of the motor has a first end connected to a node N1 and the coils have a second end connected to a common node. Another variant is possible in which the coils are energized by a full-wave or full-bridge circuit. In the same way as in the example shown in FIG. 2 each coil therein has a first end connected to a first node between a first and a second semiconductor element. However, the coil has its second end connected to a second node between a further first and a further second semiconductor element. Such a circuit arrangement has a first phase, in which a current flows from a first supply terminal to a second supply terminal via the first semiconductor element, via the coil and via the further second semiconductor element, and a second phase, in which the current flows from the first supply terminal to the second supply terminal via the further first semiconductor element, via the coil and via the second semiconductor element. The polarity detection means 10 of FIG. 2 may then be coupled either to the first series arrangement of semiconductor elements or to the series arrangement formed by the further first and the further second semiconductor element.

Figure 3:
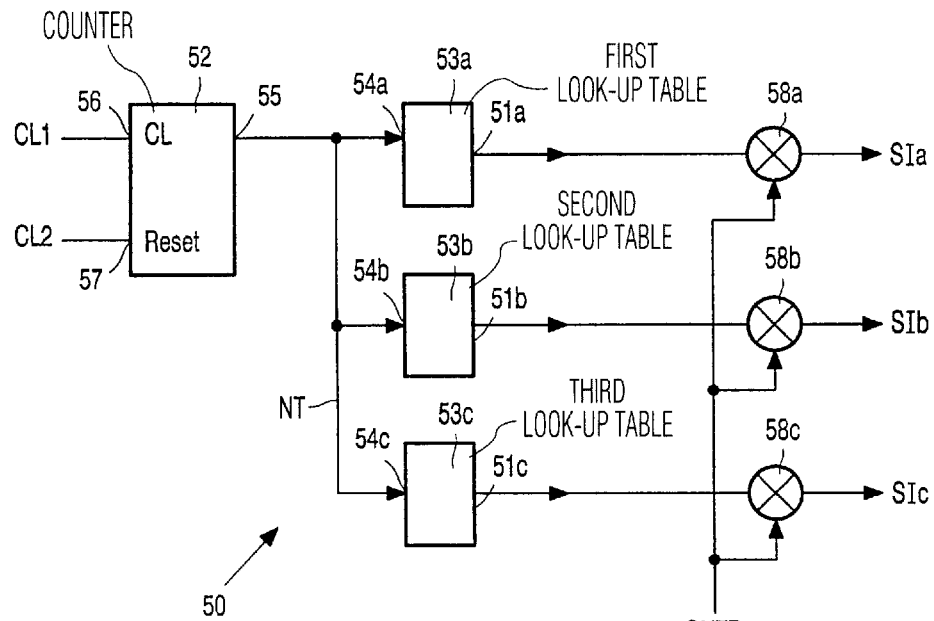
FIG. 3 shows in greater detail a second part of the control unit shown in FIG. 1, FIGS. 4A to D illustrate the operation of the polarity detector.

FIG. 3 shows a sinewave generator in greater detail. The sinewave generator 50 shown has a counter 52, and a first look-up table 53a, a second look-up table 53b and a third look-up table 53c, having their respective address inputs 54a–c coupled to the output 55 of the counter 52. The look-up tables 53a–c each contain a sine table which generates a sine value in response to each address value supplied by the output 55 of the counter 52, the sine values of the second look-up table 54b and of the third look-up table 54c being shifted 120 and 240 degrees, respectively, with respect to those of the first look-up table 54a. The sine values at the output of the look-up tables 53a–c are multiplied by a signal CNTR by means of multipliers 58a–c. The signal CNTR enables the speed of the motor to be controlled. The counter 52 has a clock input 56 which receives the first clock signal CL1 from the PLL and has a reset input 57 which receives the second clock signal CL2 from the PLL.

The present control unit operates as follows. When the control unit 1 is switched on with the motor 5 in the rest position the speed detector 80 detects that the speed of the motor is below a predetermined speed. The speed detector 80 supplies a signal which causes the switching means 70a–c to select the signals from the starting circuit 90 as input signals for the supply means 20a–c. The starting circuit 90 now accelerates the motor 5 until the speed is higher than the predetermined speed. The speed detector 80 then supplies a switching signal which causes the switching means 70a–c to select the signal from the pulsewidth modulators 60a–c as the signal for controlling the supply means 20a–c. As a result of this, the coils 5a–c of the motor 5 are energized with a pulse-width modulated voltage S5 as shown in FIG. 5A. The pulse width varies as a sinusoidal function of time. This results in a sinusoidal current Ia, with a high-frequency modulation superposed on it, through the coil 5a of the motor 5 (see FIG. 5B). During the rotation of the motor 5 the polarity detector 10 generates a polarity signal S1 which is a measure of the polarity of the current Ia through one of the coils 5a of the motor 5. The polarity signal S1 is shown in FIG. 5C. The phase-locked loop 40 generates a first clock signal CL1 and a second clock signal CL2, which are locked to the polarity signal S1. The first clock signal CL1 has a frequency which is an integral multiple of the frequency of the polarity signal S1. The second clock signal CL2 has a frequency equal to that of the polarity signal S2. The controllable delay element 47 generates the feedback signal S4 shown in FIG. 5D from the second clock signal CL2. FIG. 5E shows the error signal S2 generated by the phase detector 43 in response to the polarity signal S1 and the feedback signal S4. FIG. 5F shows the filtered error signal S3 generated from the error signal S2 by the integrator 44. In the present example the phase detector 43 includes logic combination means in the form of an EXOR gate. Thus, as is shown in FIG. 5F, the filtered error signal S3 is only influenced to a small extent by the high-frequency variations in the current Ia through the coil 5a. The use of logic combination means as the phase detector 43 further has the advantage that the filtered error signal S3 is highly immune to an offset in the polarity detector 10. This will be explained with reference to FIGS. 6A–E and FIGS. 7A–E. For the sake of simplicity the signals shown in these Figures are based on a purely sinusoidal supply current Ia. The explanation is also valid in the case that a high-frequency signal is superposed on the sinusoidal current Ia. In FIG. 6B the uninterrupted waveform is the polarity signal S1 in response to the supply current Ia shown in FIG. 6A if no offset occurs in the polarity detector 10. If an offset occurs in the polarity detector 10, as is shown symbolically by the dashed line in FIG. 6A, the polarity detector 10 supplies the polarity signal S1 shown as a broken-line waveform in FIG. 6B. FIG. 6C shows the feedback signal S4 in both cases. In FIG. 6D the uninterrupted waveform and the broken-line waveform respectively represent the error signal S2 in the absence of an offset and in the case of an offset. In FIG. 6E the uninterrupted waveform and the broken-line waveform respectively show the filtered error signal S3 in these two cases. From FIG. 6E it is apparent that the occurrence of an offset in the polarity detector 10 does not lead to a systematic deviation in the filtered error signal S3. Likewise, a similar comparison has been made in FIGS. 7A to 7E for the situation in which there is a phase difference between the polarity signal S1 and the feedback signal S4. From FIG. 7E it is apparent that there is an increase of the filtered error signal S3 in both cases. In both cases the increase is not stopped until the feedback signal S4 is again in phase with the polarity signal S1, as shown in FIGS. 6A to 6E.

The counter 52 of the sinewave generator 50 is reset upon each period of the second clock signal CL2. The output signal NT of the counter 52, which serves as the address for the look-up tables 53a–c, is incremented upon each period of the first clock signal CL1. In response thereto the look-up tables 53a–c supply sinusoidal output signals S1a–c, which are 120 degrees phase-shifted with respect to one another. During operation of the control unit 1 the controllable semiconductor elements T1, T2 are alternately turned on and turned off by the control signal S5 supplied by the pulse-width modulator 60a via the switching element 70a.

Figure 4A:
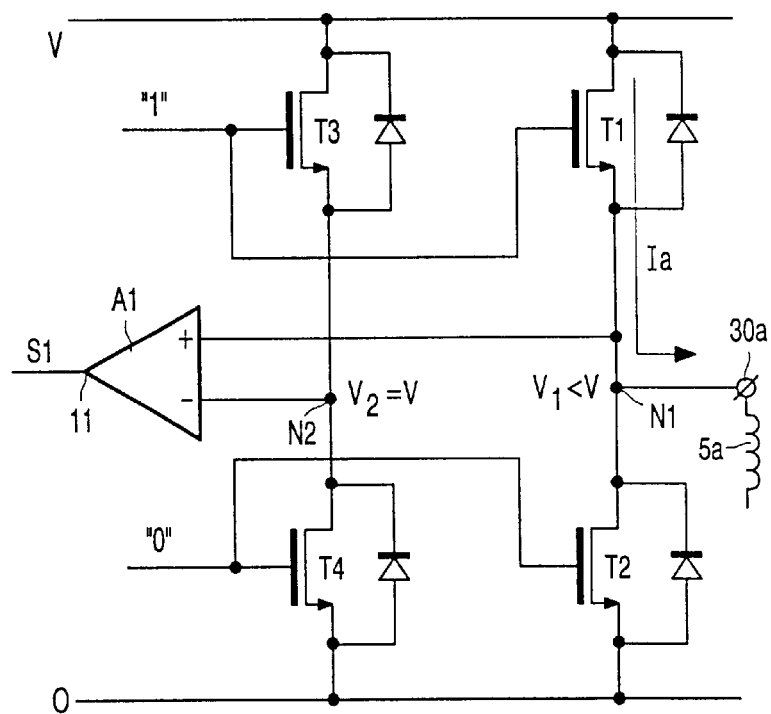

FIGS. 4A–4D show different states of the supply means shown in FIG. 2. Of the supply means 20a–c only the supply unit 20a for energizing the coil 5a is shown for the sake of simplicity. In FIG. 4A the semiconductor elements T1 and T3 are in an on state and the semiconductor elements T2 and T4 are in an off state. The series arrangement formed by the semiconductor elements T1, T3 supply a current Ia to the coil 5a, which current flows in a direction from the node N1 to the coil 5a. This produces a voltage drop across the semiconductor element T1, as a result of which the voltage on the node N1 is smaller than the first supply voltage V. Since the comparator A1 hardly draws any current from the node N2 the voltage position this node N2 is approximately equal to the first supply voltage V in this situation. Consequently, the comparator A1 supplies a negative output signal S1 in situation the situation shown in FIG. 4A.

Figure 4B:
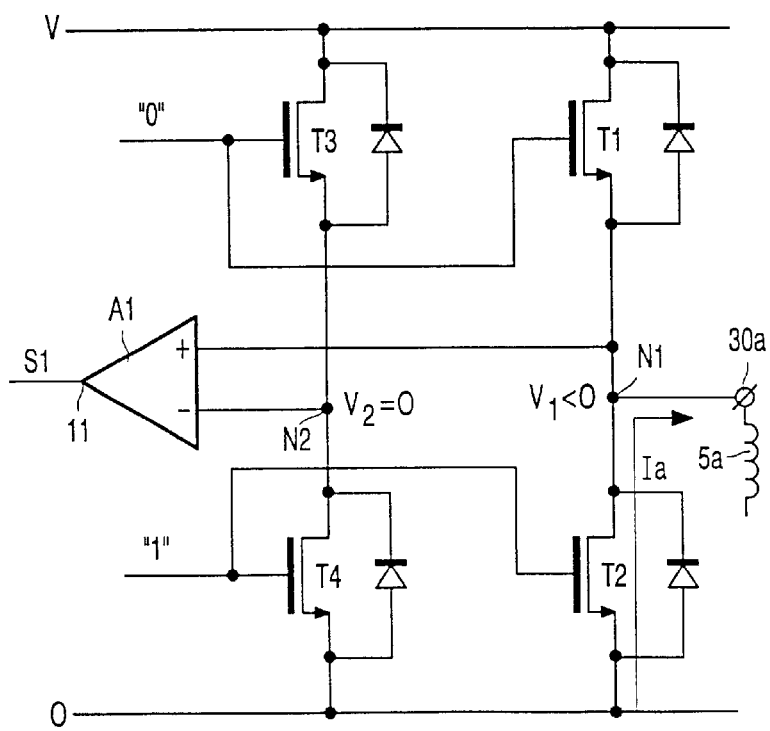

In the situation shown in FIG. 4B the semiconductor elements T2 and T4 are in an on state and the semiconductor elements T1 and T3 are in an off state. A current Ia flows from the semiconductor element T2 to the coil 5a via the node N1. The polarity of the current Ia through the coil 5a is consequently unchanged. In this situation a voltage drop is produced across the semiconductor element T2, as a result of which the voltage on the node N1 is smaller than 0. The voltage on the node N2 is approximately 0 in the situation shown in FIG. 4B. Therefore, the comparator A1 also supplies a negative output signal S1 in the present case.

Figure 4C:
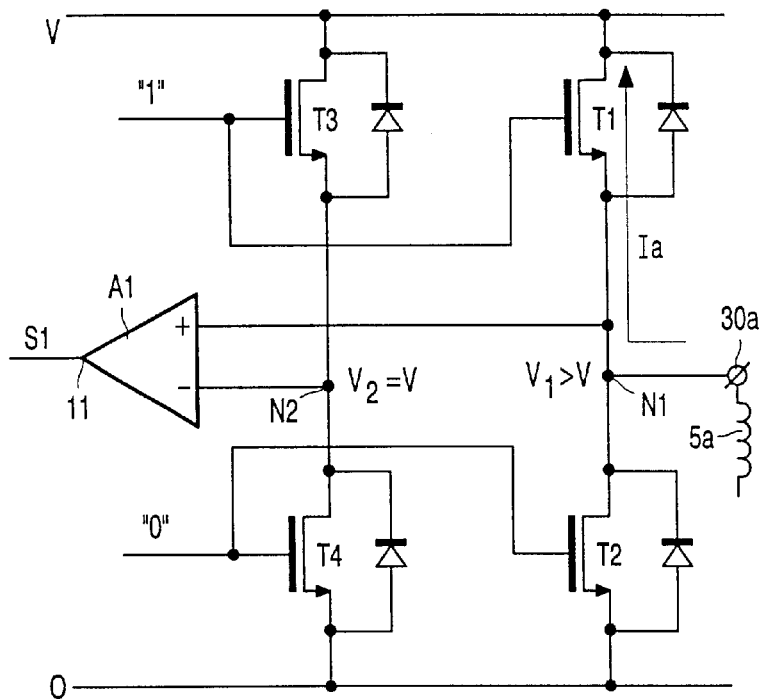

In the situation shown information FIG. 4C the semiconductor elements T1 and T3 are conductive and the semiconductor elements T2 and T4 are non-conductive. A current flows from the coil 5a to the semiconductor element T1 via the first node N1. The current Ia produces a voltage drop, as a result of which the voltage on the first node N1 is higher than V. The voltage on the second node N2 is approximately equal to V. The comparator A1 now supplies a positive output signal.

Figure 4D:
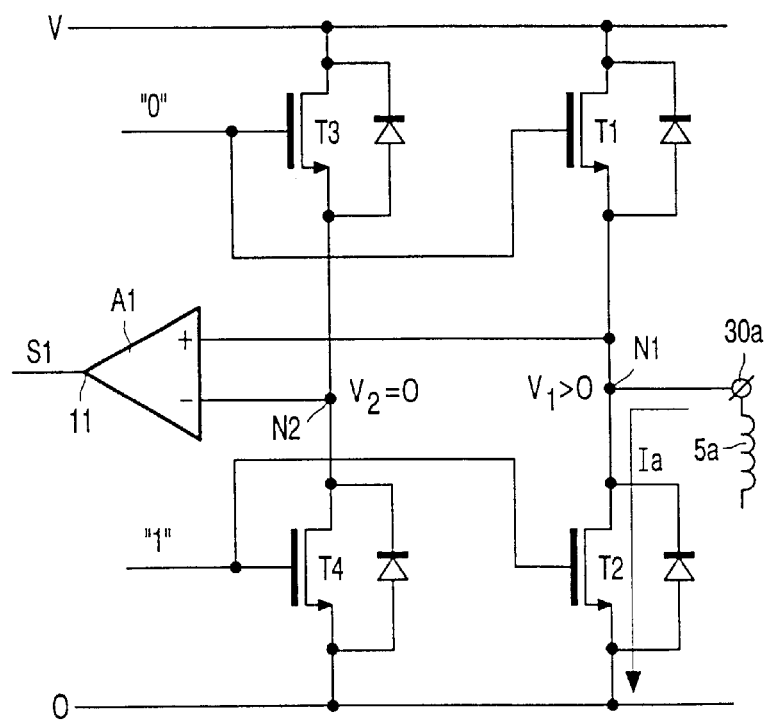

In the situation shown in FIG. 4D the semiconductor elements are conductive and the semiconductor elements T1 and T3 are non-conductive. A current flows from the coil 5a to the semiconductor element T2 via the node N1. This produces a voltage drop across T2, as a result of which the voltage on the node N1 is greater 0. The voltage on the node N2 is approximately 0. The comparator A1 then again supplies a positive output signal S1. From the foregoing it is apparent that the output signal S1 of the comparator depends only on the direction of the current Ia through the coil 5a. The output signal S1 is negative if the current Ia has a direction from the node N1 to the coil 5a and is positive in the opposite direction.

FIG. 8 shows diagrammatically a device for reading and/or writing a rotating information carrier 6. The information carrier 6 is for example a magnetic, optical or magneto-optical information carrier. The device has a transducer 7 for a pattern recorded on the information carrier 6, for example a magnetic or optical pattern, into a read signal SL, or for recording such a pattern on the information carrier in response to a write signal SW. The device has a brushless motor 5 for rotating the information carrier 6 about an axis 4 and has a control unit 1 in accordance with the invention for controlling the motor 5. The control unit 1 is for example of a type as described with reference to FIG. 1. The transducer 7 is radially movable with respect to the axis 4 by positioning means 8. The positioning means 8 may include coarse and fine positioning means. The positioning means 8, the control unit 1 and the transducer 7 are coupled to a microprocessor 9.

FIGS. 9A–9D show the polarity detection means in a further embodiment of the control unit in accordance with the invention. Parts therein which correspond to those in FIG. 2 bear the same reference symbols. In the present further embodiment each of the switching elements T1, T2 is bridged by the input terminals of a differential amplifier A2, A3. The differential amplifiers A2, A3 have their outputs coupled to the output terminal 11, for the supply of the polarity signal S1, via the main current path of a respective controllable semiconductor element T3, T4. As in the embodiment shown in FIG. 2, the semiconductor element T3 has its control input coupled to the control input of the semiconductor element T1. The semiconductor element T4 has its control input coupled to the control input of the semiconductor element T2. FIGS. 9A to 9D each show one of four states of the polarity detector and the output stage T1, T2 to which this detector is coupled.

Figure 9A:
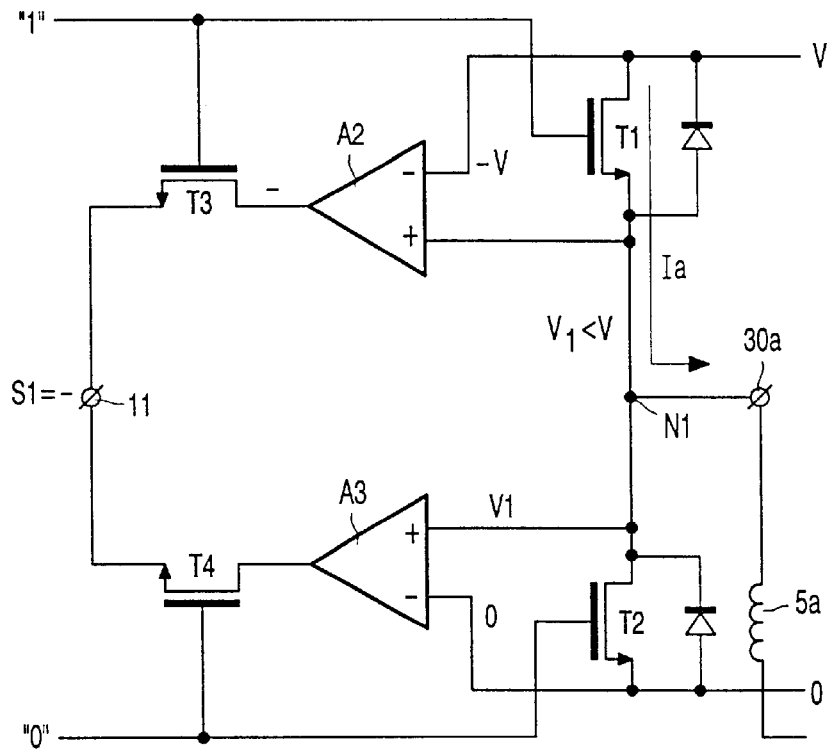
FIGS. 9A to 9D show the polarity detection circuits in a further embodiment of the control unit in accordance with the invention.

In the first state shown in FIG. 9A the first semiconductor element T1 conducts and the current Ia has a direction from the semiconductor element T1 to the coil 5a. The current Ia produces a voltage drop across the semiconductor element T1, which results in a voltage V1<V on the node N1. Consequently, the voltage on the non-inverting input terminal of the differential amplifier A2 is lower than that on its inverting input terminal, as a result of which the value of the output signal of the differential amplifier A2 is low, which is indicated by means of a minus sign "−". Since the control electrode of the semiconductor element T3 is coupled to that of the semiconductor element T1, the semiconductor element T3 is conductive, as a result of which the value of the polarity signal S1 is also low, which is indicated by "S1=−". The output signal of the second differential amplifier A3 has no influence on the polarity signal in this situation, because the semiconductor element T4 is then non-conductive.

Figure 9B:
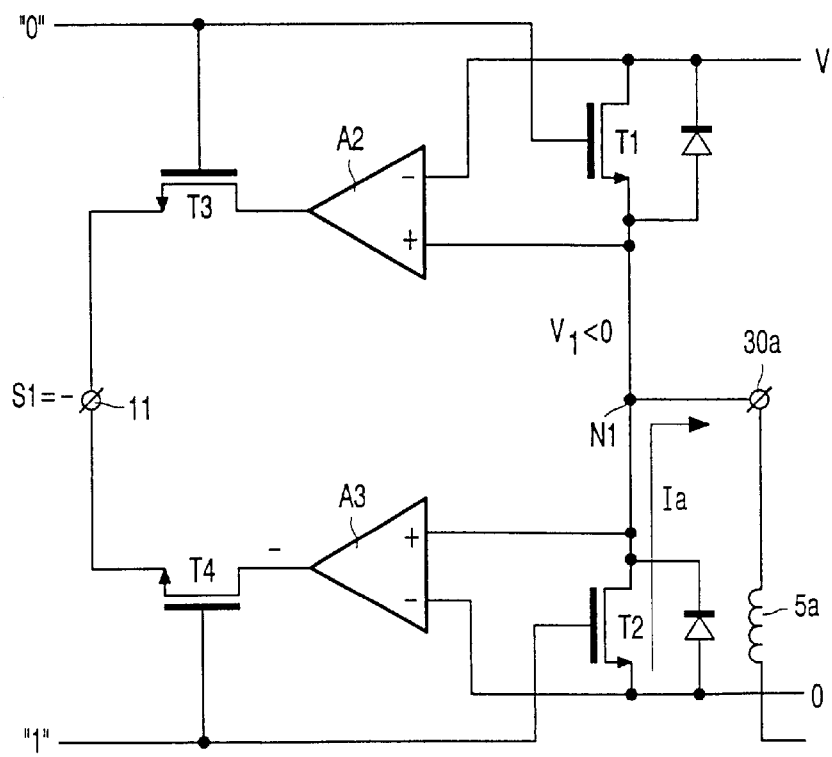

In the second state shown in FIG. 9B the second semiconductor element T2 conducts and the current Ia has a direction from the semiconductor element T2 to the coil 5a. This produces a voltage drop across the semiconductor element T2, which results in a voltage V1<0 on the node N1. Consequently, the voltage on the non-inverting input terminal of the differential amplifier A3 is lower than that on its inverting input terminal, as a result of which the value of the output signal of the differential amplifier A3 is low (indicated by "−"). Since the semiconductor element T4 has its control electrode coupled to that of the semiconductor element T2, the semiconductor element T4 is conductive, as a result of which the value of the polarity signal S1 is also low (S1=−). The output signal of the first differential amplifier A2 has no influence on the polarity signal in this situation because the semiconductor element T3 is then non-conductive.

Figure 9C:
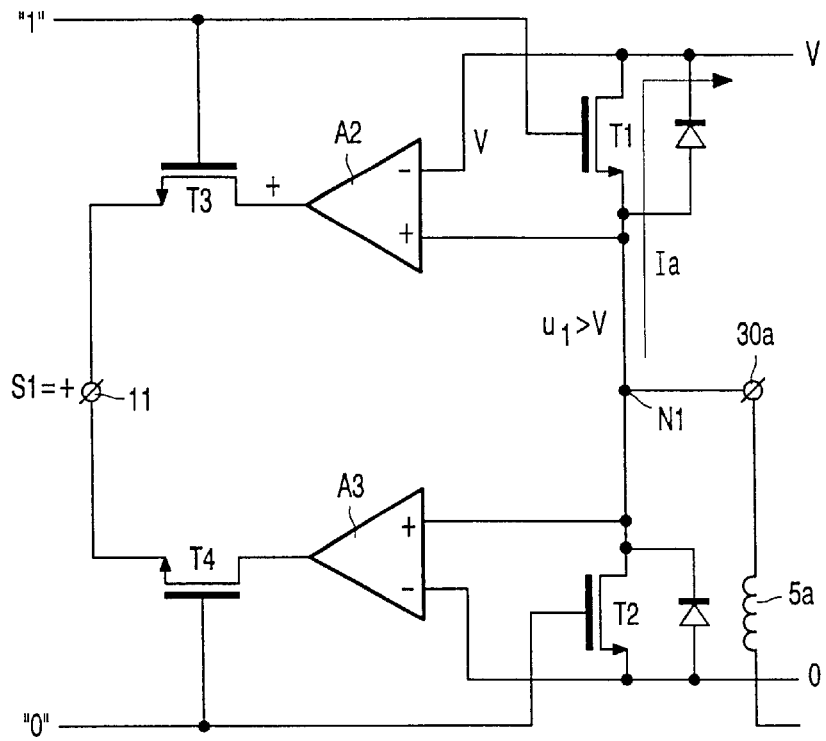

In the third state shown in FIG. 9C the first semiconductor element T1 is conductive and the current Ia has a direction from the coil 5a to the semiconductor element T1. The current Ia produces a voltage drop across the semiconductor element T1, as a result of which the voltage on the node N1 assumes a value V1>V. The differential amplifier A2 then supplies an output signal having a high value (indicated by "+"). In the third state the output terminal 11 is coupled to the output of the differential amplifier A2 via the semiconductor element T3, as a result of which the value of the polarity signal S1 is also high (S1=+).

Figure 9D:
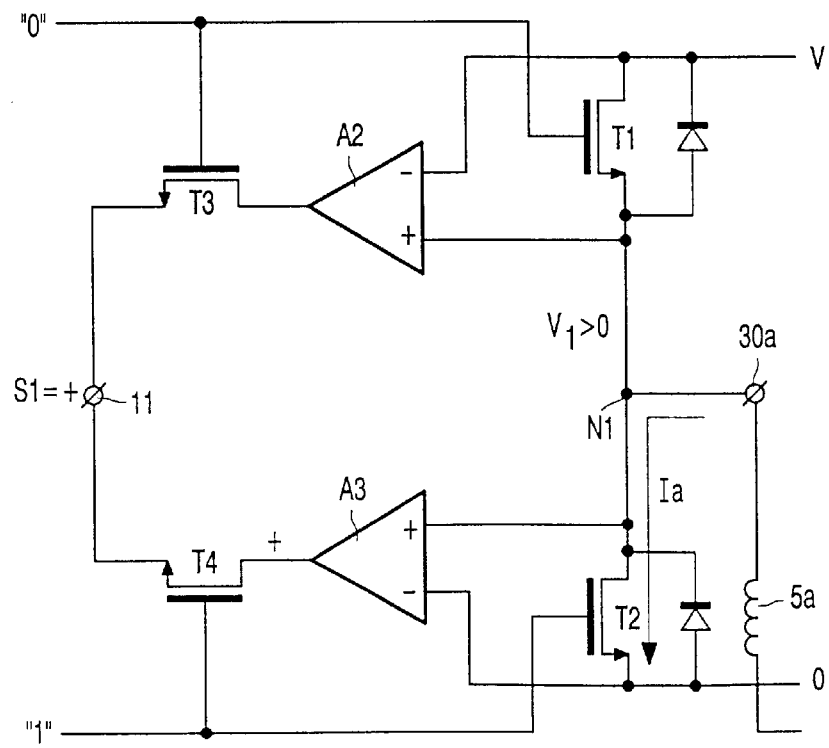

FIG. 9D shows the fourth state, in which the second semiconductor element T2 is conductive and the current has a direction from the coil 5a to the semiconductor element T2. The current Ia produces such a voltage drop across the semiconductor element T2 that the voltage on the node N1 assumes a value V1>0. The differential amplifier A3 then supplies an output signal having a high value (indicated by "+"). In the fourth state the output terminal 11 is coupled to the output of the differential amplifier A3 via the semiconductor element T4, as a result of which the value of the polarity signal S1 is also high (S1=+).

Although the invention has been described with reference to preferred embodiments, the invention is not limited thereto. Thus, many variants are conceivable to one skilled in the art without departing from the scope of the invention as defined in the Claims. The invention, insofar as it is embodied in the apparatus, can be implemented by hardware as well as software means and different "means" may be materialized by the same hardware item. The use of the verb "to comprise" does not exclude the presence of elements other than those mentioned in a claim. The use of the indefinite article "a" before an element does not exclude the presence of a plurality of such elements. The invention resides in any novel feature or combination of features.

What is claimed is:

1. A control unit (1) for a brushless motor (5), comprising position detection means (10) for generating a signal (S1) indicative of the position of the motor (5), supply means (20a, 20b, 20c) for energizing two or more coils (5a, 5b, 5c) of the motor (5) in response to said signal (S1), output terminals (30a, 30b, 30c) for electrically coupling the coils (5a–c) to the supply means (20a–c), characterized in that the position detection means (10) include polarity detection means for generating a polarity signal (S1) which is a measure of the direction of a current (Ia) through at least one of the coils (5a).

2. A control unit as claimed in claim 1, characterized in that the supply means (20a) comprise a first series arrangement of controllable semiconductor elements (T1, T2), an output terminal (30a) being coupled to a first node (N1) of the semiconductor elements, and the polarity detection means (10) comprise a second series arrangement of controllable semiconductor elements (T3, T4), which second series arrangement has a second node (N2), and the semiconductor elements (T3, T4) in the second series arrangement being driven in synchronism with the semiconductor elements in the first series arrangement, which polarity detection means (10) further include voltage comparison means (A1) having a first input (A11) coupled to the first node (N1) and having a second input (A12) coupled to the second node (N2).

3. A control unit as claimed in claim 1, further characterized by modulating means (60a, 60b, 60c) for generating a pulse-width modulated control signal (PWMa, PWMb, PWMc) for controlling the supply means (20a, 20b, 20c).

4. A control unit as claimed in claim 1, characterized in that the supply means include a phase-locked loop (40).

5. A control unit as claimed in claim 4, characterized in that the phase-locked loop (40) includes logic combination means (43) for determining a phase difference between the polarity signal (S1) and a feedback signal (S4) of the phase-locked loop.

6. A device for reading and/or writing a rotating information carrier (6), which device includes a transducer (7) for converting a pattern recorded on the information carrier into a read signal (SL), or for recording a pattern on the information carrier in response to a write signal (SW), which device includes a brushless motor (5) for rotating the information carrier (6) and a control unit (1) as claimed in claim 1, for controlling the motor.

* * * * *